US009267080B2

(12) United States Patent

Oka et al.

(10) Patent No.: US 9,267,080 B2
(45) Date of Patent: Feb. 23, 2016

(54) CARBONIZATION FURNACE FOR MANUFACTURING CARBON FIBER BUNDLE AND METHOD FOR MANUFACTURING CARBON FIBER BUNDLE

(71) Applicant: MITSUBISHI RAYON CO., LTD., Chiyoda-ku (JP)

(72) Inventors: Yusuke Oka, Otake (JP); Nobuyuki Yamamoto, Toyohashi (JP); Akito Hatayama, Toyohashi (JP)

(73) Assignee: MITSUBISHI RAYON CO., LTD., Chiyoda-ku (JP)

( * ) Notice: Subject to any disclaimer, the term of this patent is extended or adjusted under 35 U.S.C. 154(b) by 0 days.

(21) Appl. No.: 14/411,298

(22) PCT Filed: Jun. 21, 2013

(86) PCT No.: PCT/JP2013/067036

§ 371 (c)(1),
(2) Date: Dec. 24, 2014

(87) PCT Pub. No.: WO2014/002879

PCT Pub. Date: Jan. 3, 2014

(65) Prior Publication Data

US 2015/0210925 A1 Jul. 30, 2015

(30) Foreign Application Priority Data

Jun. 27, 2012 (JP) ................................ 2012-144239

(51) Int. Cl.
*C01B 21/00* (2006.01)
*D01F 9/14* (2006.01)
(Continued)

(52) U.S. Cl.
CPC . *C10B 21/00* (2013.01); *D01F 9/14* (2013.01); *D01F 9/32* (2013.01); *F27B 9/28* (2013.01); *F27D 7/02* (2013.01)

(58) Field of Classification Search
CPC ............... D01F 9/32; D01F 9/14; F27B 9/28; C10B 21/00; F27D 7/02
USPC ............................ 423/447.4–447.9; 422/150
See application file for complete search history.

(56) References Cited

U.S. PATENT DOCUMENTS 4,314,981 A * 2/1982 Miyamori et al. ...... D01F 9/322 264/29.2
4,543,241 A * 9/1985 Yoshinari et al. ......... D01F 9/14 264/29.2

(Continued)

FOREIGN PATENT DOCUMENTS

JP 60-8640 3/1985
JP 62-84288 4/1987

(Continued)

OTHER PUBLICATIONS

International Search Report issued Aug. 20, 2013, in PCT/JP13/067036 filed Jun. 21, 2013.

*Primary Examiner* — Daniel C McCracken
(74) *Attorney, Agent, or Firm* — Oblon, McClelland, Maier & Neustadt, L.L.P.

(57) ABSTRACT

Provided is a carbonization furnace in which disordering of fiber bundles does not occur and there is no lack of uniformity throughout the entire furnace interior, even in the supply of heated inert gas. A carbonization furnace for manufacturing carbon fiber bundles, the furnace being provided with a heat treatment chamber, an inlet sealed chamber and an outlet sealed chamber, a gas spray nozzle, and a conveyance path, wherein: the gas spray nozzle (4) has a double tube structure obtained from a hollow cylindrical inner tube (8) and a hollow cylindrical outer tube (7), and is disposed in a direction that is horizontal and is orthogonal to the fiber bundle conveyance direction; in the outer tube, multiple gas-spraying holes (7*a*) are disposed across the width of the conveyance path in the longitudinal direction of the outer tube, and the area of the gas-spraying holes of the outer tube is 0.5 mm2 to 20 mm2; in the inner tube, multiple gas-spraying holes (8*a*) are disposed across the width of the conveyance path in the longitudinal direction of the inner tube such that the gas-spraying directions of the gas-spraying holes are in two or more directions of the circumferential direction of the inner tube, and the interval of the gas-spraying holes of the inner tube in the longitudinal direction of the inner tube is 300 mm or less.

13 Claims, 3 Drawing Sheets

(51) Int. Cl.

| | |
|---|---|
| ***C10B 21/00*** | (2006.01) |
| ***D01F 9/32*** | (2006.01) |
| ***F27B 9/28*** | (2006.01) |
| ***F27D 7/02*** | (2006.01) |

(56) References Cited

U.S. PATENT DOCUMENTS 5,193,996 A * 3/1993 Mullen ..................... D01F 9/14
34/640
6,485,592 B1 * 11/2002 Yoshimura et al. .. B65H 69/061
156/148

FOREIGN PATENT DOCUMENTS

| | | |
|---|---|---|
| JP | 62-211383 | 9/1987 |
| JP | 62-263971 | 11/1987 |
| JP | 7-96714 | 4/1995 |
| JP | 2001-98428 | 4/2001 |
| JP | 2004-19053 | 1/2004 |
| JP | 2005-274495 | 10/2005 |
| JP | 2006-274495 | 10/2006 |
| JP | 2007-224483 | 9/2007 |
| JP | 2010-7209 | 1/2010 |

* cited by examiner

CARBONIZATION FURNACE FOR MANUFACTURING CARBON FIBER BUNDLE AND METHOD FOR MANUFACTURING CARBON FIBER BUNDLE

TECHNICAL FIELD

The present invention relates to a carbonization furnace for manufacturing a carbon fiber bundle to manufacture a carbon fiber bundle by firing a fiber bundle, and a method for manufacturing a carbon fiber bundle using the carbonization furnace.

BACKGROUND ART

Carbon fibers constituting the carbon fiber bundle have a superior specific strength and a superior specific modulus as compared to other fibers. Furthermore, the carbon fibers have a number of excellent characteristics such as a superior specific resistance and higher chemical resistance as compared to metals. Hence, the carbon fiber bundle is widely used in the sports field, the aerospace field and the like as a reinforcing fiber for composite materials with resins utilizing its various excellent characteristics.

The carbon fiber bundle is usually obtained by heating (carbonization treatment) a flameproofed fiber bundle, which is obtained by heating (flameproofing treatment) a carbon fiber precursor fiber bundle (precursor yarn bundle) such as polyacrylonitrile or rayon at from 200 to 300° C. in an oxidizing atmosphere, at from 800 to 1500° C. in an inert atmosphere such as nitrogen or argon. Furthermore, this carbon fiber bundle is also heated (graphitization treatment) at from 2000 to 3000° C. to manufacture a carbon fiber bundle which exhibits a higher modulus of elasticity in tension, namely, a graphite fiber bundle. In these carbonization treatment process and graphitization treatment process, in many cases, a great number of fiber bundles are arrayed and conveyed into a carbonization furnace and a graphitization furnace simultaneously in order to increase the production efficiency.

Typically, each of the carbonization furnace to perform the carbonization treatment and the graphitization furnace to perform the graphitization treatment consists of a heat treatment chamber corresponding to a furnace body to perform the heating of the fiber bundle in an inert atmosphere and a sealing chamber which is configured to maintain the inert atmosphere of the heat treatment chamber and furnished to each of a fiber bundle inlet (inlet portion) and the fiber bundle outlet (outlet portion) provided in the front and back of the heat treatment chamber.

Specific roles of the sealing chamber is mainly to prevent the reaction gas generated from the fiber bundle in the heat treatment chamber from flowing out to the outside via the fiber bundle inlet or the fiber bundle outlet of the heat treatment chamber as well as to prevent a decrease in quality and grade of the carbon fiber bundle as oxygen enters the heat treatment chamber from the outside and thus the inside of the heat treatment chamber is in an oxidizing atmosphere. The running fiber bundle is contaminated by the tar-like substance formed when the outflowed reaction gas is cooled in some cases, particularly when the reaction gas from the heat treatment chamber is flown out to the vicinity of the inlet or outlet of the furnace.

In addition, an inert gas is supplied to the sealing chamber in order to maintain the inert atmosphere by sealing the heat treatment chamber, but the unevenness in supply of the inert gas leads to not only the unevenness in atmosphere in the sealing chamber but also the unevenness in atmosphere in the heat treatment chamber.

On the other hand, an increase in productivity and a decrease in cost have been required to the recent technology for manufacturing the carbon fiber bundle, and significant improvements have been achieved. For example, improvements such as the highly dense array to array and heat treat a great number of fiber bundles at the same time by increasing the mechanical width of the heat treatment chamber (width of the heat treatment chamber allowing the fiber bundle to run) or a multistage treatment to increase the number of stages of the fiber bundle to be simultaneously heat treated. In such a situation, the unevenness in atmosphere in the sealing chamber caused by the unevenness in supply of the inert gas leads to the occurrence of the unevenness in heat treatment of the fiber bundle or the inhibition on the inert atmosphere maintenance in the heat treatment chamber in some cases. As a result, the unevenness in supply of the inert gas in the sealing chamber causes the unevenness in quality of the carbon fiber bundle and thus becomes a major obstacle in improving the productivity of the carbon fiber bundle in some cases.

A method is proposed in Patent Document 1 in which the inert gas which has been heated in advance is injected through the injection port using a carbonization furnace equipped with a heat treatment chamber, an inert gas injection port, and an inert gas introducing member to introduce the injected inert gas into the direction of the heat treatment chamber so as to prevent the contamination of the fiber bundle.

In addition, a sealing mechanism is proposed in Patent Document 2 which is superior in maintainability by having a removable structure while adopting the labyrinth structure. As the method of supplying the inert gas, a method is proposed in which the inert gas passes through at least one or more perforated plate and thus is jetted out in sheet form.

CITATION LIST

Patent Document

Patent Document 1: JP 2007-224483 A
Patent Document 2: JP 2001-98428 A

SUMMARY OF THE INVENTION

Problem to be Solved by the Invention

The method of supplying the inert gas is not particularly limited in Patent Document 1, but the slit shape is easily deformed when the jetting holes has a slit shape and thus the unevenness in jetting easily occurs. In addition, in the related art, the unevenness in temperature of the inert gas to be supplied is caused by the heat loss due to the temperature difference between the heated inert gas and the atmosphere in the furnace in some cases. This causes the unevenness in heat treatment of the fiber bundle, and consequently the unevenness in quality of the carbon fiber bundle occurs in some cases.

In addition, in the method of Patent Document 2, the jetting-out flow velocity of the inert gas tends to decrease in the case of a horizontal type carbonization furnace in which the fiber bundle runs in a horizontal direction, and thus the flameproofed fiber yarn waste or a carbide is easily accumulated on the perforated plate. In addition, a decrease in temperature of the inert gas is easily caused by the heat loss through the surface of the sealing chamber in the case of supplying the heated inert gas to the sealing chamber. The unevenness in temperature due to heat loss shows a strong tendency to occur particularly in the case of supplying the heated inert gas from the side face of the carbonization furnace and thus the unevenness in treatment between the fiber yarns shows a strong tendency to occur.

Furthermore, a decrease in mechanical properties and production stability mainly caused by the defects of the fiber bundle at the entrance of the carbonization furnace, and furthermore, the unevenness in quality are prone to occur along with the improvement and progress in the production technologies described above, and thus it is difficult to maintain the mechanical properties and production stability and to suppress the unevenness in quality of the carbon fiber bundle by the method of supplying the inert gas to the sealing chamber in the related art in some cases.

The invention has been achieved in order to improve these phenomena. An object of the invention is to provide a carbonization furnace for manufacturing a carbon fiber bundle which does not cause a disturbance in running of the fiber bundle and is able to maintain an even atmosphere over the entire region in the carbonization furnace even when a heated inert gas is supplied, and a method for manufacturing a carbon fiber bundle using the carbonization furnace.

Means for Solving Problem

The invention adopts the following configurations in order to achieve the above object.

[1] A carbonization furnace for manufacturing a carbon fiber bundle including:

a heat treatment chamber for heating a fiber bundle which has a fiber bundle inlet and a fiber bundle outlet through which the fiber bundle is introduced and withdrawn and is filled with an inert gas;

an inlet sealing chamber and an outlet sealing chamber for sealing the gas in the heat treatment chamber which are disposed to be adjacent to the fiber bundle inlet and the fiber bundle outlet of the heat treatment chamber, respectively;

a gas jetting nozzle provided on at least one of the inlet sealing chamber and the outlet sealing chamber; and a conveying path for conveying the fiber bundle which is provided in the horizontal direction in the inlet sealing chamber, the heat treatment chamber, and the outlet sealing chamber, in which the gas jetting nozzle has a double tube structure consisting of a hollow tubular inner tube and a hollow tubular outer tube and is disposed in a direction orthogonal and horizontal to a conveying direction of the fiber bundle, in which a plurality of gas jetting holes are arranged on the outer tube in a longitudinal direction of the outer tube over the length corresponding to a width of the conveying path, and a hole area of the gas jetting holes of the outer tube is 0.5 $mm^2$ or more and 20 $mm^2$ or less, and a plurality of gas jetting holes are arranged on the inner tube in a longitudinal direction of the inner tube over the length corresponding to a width of the conveying path and a gas jetting direction of the gas jetting holes is arranged in two or more directions of a circumferential direction of the inner tube, and a hole interval between the gas jetting holes of the inner tube in the longitudinal direction of the inner tube is 300 mm or less.

[2] The carbonization furnace for manufacturing a carbon fiber bundle according to [1], in which a ratio (L/D) of a flow path length (L) of a plurality of gas jetting holes of the outer tube to a longest hole length (D) of the gas jetting holes is 0.2 or more.

[3] The carbonization furnace for manufacturing a carbon fiber bundle according to [1] or [2], in which a hole interval of a plurality of gas jetting holes in a longitudinal direction of the outer tube is 100 mm or less.

[4] The carbonization furnace for manufacturing a carbon fiber bundle according to any one of [1] to [3], in which a plurality of gas jetting holes of the outer tube are arranged in a longitudinal direction of the outer tube over the length corresponding to a width of the conveying path at equal intervals.

[5] The carbonization furnace for manufacturing a carbon fiber bundle according to any one of [1] to [4], in which each hole area of a plurality of gas jetting holes of the inner tube is 50 $mm^2$ or less.

[6] The carbonization furnace for manufacturing a carbon fiber bundle according to any one of [1] to [5], in which a plurality of gas jetting holes of the inner tube are arranged in a longitudinal direction of the inner tube over the length corresponding to a width of the conveying path at equal intervals.

[7] The carbonization furnace for manufacturing a carbon fiber bundle according to any one of [1] to [6], in which a plurality of gas jetting holes of the outer tube are arranged in a direction in which an inert gas is not jetted out toward the fiber bundle.

[8] The carbonization furnace for manufacturing a carbon fiber bundle according to any one of [1] to [7], in which a plurality of gas jetting holes having the same shape and dimension are arranged on the outer tube and a plurality of gas jetting holes having the same shape and dimension are arranged on the inner tube.

[9] The carbonization furnace for manufacturing a carbon fiber bundle according to any one of [1] to [8], in which a plurality of gas jetting holes of the outer tube and a plurality of gas jetting holes of the inner tube are respectively disposed at positions where a gas jetting direction of the gas jetting holes of the inner tube and a gas jetting direction of the gas jetting holes of the outer tube are not overlapped at all.

[10] The carbonization furnace for manufacturing a carbon fiber bundle according to any one of [1] to [9], in which either or both of the inlet sealing chamber and the outlet sealing chamber have a labyrinth structure having a throttling piece arranged in a conveying direction of the fiber bundle with a regular interval.

[11] The carbonization furnace for manufacturing a carbon fiber bundle according to any one of [1] to [10], in which either or both of the inlet sealing chamber and the outlet sealing chamber have one or more pairs of the gas jetting nozzles disposed at positions facing each other in a vertical direction by sandwiching the fiber bundle.

[12] A method for manufacturing a carbon fiber bundle including a process of heat treating the fiber bundle by the carbonization furnace for manufacturing a carbon fiber bundle according to any one of [1] to [11], in which in the process, an inert gas at from 200 to 500° C. is supplied to an inner tube of the gas jetting nozzle and the inert gas is jetted out through a plurality of gas jetting holes of an outer tube such that a temperature difference in a width direction of either or both of the inlet sealing chamber and the outlet sealing chamber which are equipped with the gas jetting nozzle is 8% or less.

[13] The method for manufacturing a carbon fiber bundle according to [12], in which an inert gas is jetted out through the gas jetting nozzle at a flow rate per 1 m in a longitudinal direction of the gas jetting nozzle of 1.0 $Nm^3$/hr or more and 100 $Nm^3$/hr or less to heat treat the fiber bundle.

Effect of the Invention

According to the invention, it is possible to provide a carbonization furnace for manufacturing a carbon fiber bundle which is able to maintain an even atmosphere over the entire region in the carbonization furnace even when a heated inert gas is supplied, and a method for manufacturing a carbon fiber bundle using the carbonization furnace.

MODE(S) FOR CARRYING OUT THE INVENTION

Figure 1A:
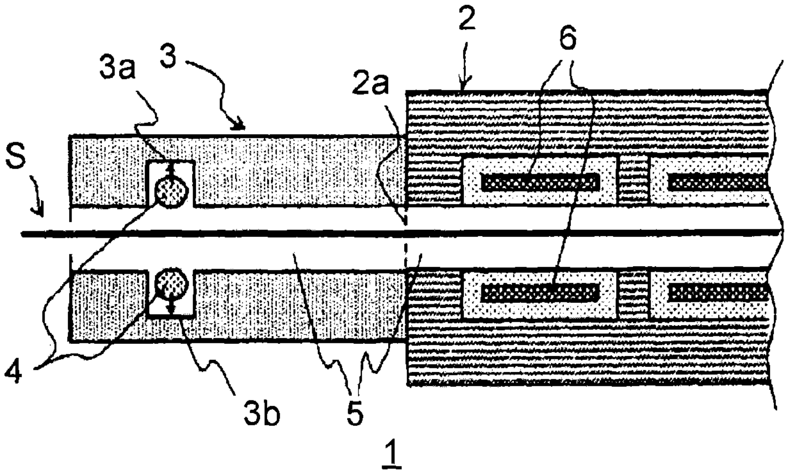
FIG. 1A is a schematic front sectional diagram of the front part (inlet sealing chamber and heat treatment chamber) according to a preferred embodiment of the carbonization furnace for manufacturing a carbon fiber bundle of the invention and FIG. 1B is a schematic plan diagram thereof.

<Carbonization Furnace for Manufacturing Carbon Fiber Bundle>

As described above, the carbon fiber bundle is usually manufactured by the manufacturing method including the following processes. (1) A flameproofing process to obtain a flameproofed fiber bundle by heat treating (flameproofing treatment) a carbon fiber precursor fiber bundle (for example, a fiber bundle constituted by polyacrylonitrile or rayon) at from 200 to 300° C. in an oxidizing atmosphere (for example, air). (2) A carbonization process to obtain a carbon fiber bundle by heat treating (carbonization treatment) the flameproofed fiber bundle thus obtained at from 800 to 1500° C. in an inert atmosphere (for example, nitrogen or argon).

Meanwhile, in this manufacturing method, it is possible to include a preliminary carbonization process to perform the heat treatment (preliminary carbonization treatment) at a temperature (for example, from 300 to 700° C.) higher than that for the flameproofing treatment and a temperature lower than that for the carbonization treatment in an inert atmosphere between the flameproofing process and the carbonization process. In addition, it is also possible to convert the carbon fiber bundle thus obtained to a carbon fiber bundle (graphitized fiber bundle) exhibiting a higher modulus of elasticity in tension by subjecting to the heat treatment (graphitization treatment) at from 2000 to 3000° C. in an inert atmosphere. Meanwhile, the number of fiber bundle is not changed through the processes, and the number of single fibers constituting each fiber bundle can be, for example, from 100 to 100000.

It is possible to perform heat treatment in the flameproofing process, the preliminary carbonization process, the carbonization process, and the graphitization process described above using a flameproofing furnace, a preliminary carbonization furnace, a carbonization furnace, and a graphitization furnace, respectively.

The carbonization furnace for manufacturing a carbon fiber bundle of the invention can be a heating furnace which is used in manufacturing a carbon fiber bundle and performs the heat treatment of a fiber bundle in an inert atmosphere and includes not only the carbonization furnace used in the carbonization process described above but also a preliminary carbonization furnace and a graphitization furnace. In other words, the carbonization furnace for manufacturing a carbon fiber bundle of the invention can be used as a preliminary carbonization furnace, a carbonization furnace or a graphitization furnace in manufacturing a carbon fiber bundle.

The inlet sealing chamber and the outlet sealing chamber (hereinafter, also referred to as the sealing chamber) provided in the carbonization furnace for manufacturing a carbon fiber bundle of the invention are one obtained by subjecting a generally used sealing chamber (sealing device) to an improvement and it can reduce the leakage of the inert gas through the fiber bundle inlet and the fiber bundle outlet of the heat treatment chamber without coming in contact with the fiber bundle running in the furnace.

Hereinafter, the carbonization furnace for manufacturing a carbon fiber bundle of the invention will be described in more detail with reference to the accompanying drawings. Meanwhile, it is possible to manufacture a carbon fiber bundle excellent in grade and strength by using the carbonization furnace for manufacturing a carbon fiber bundle of the invention.

Figure 1B:
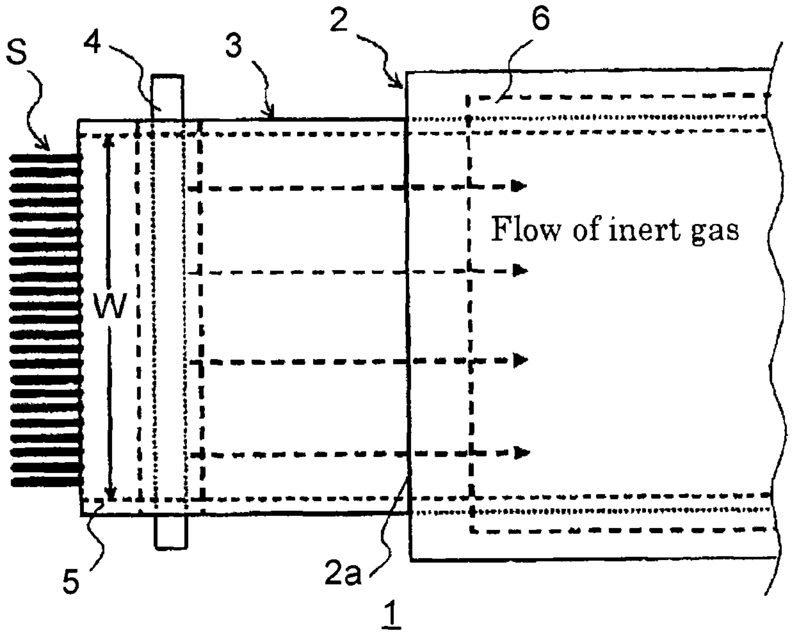
Figure 2:
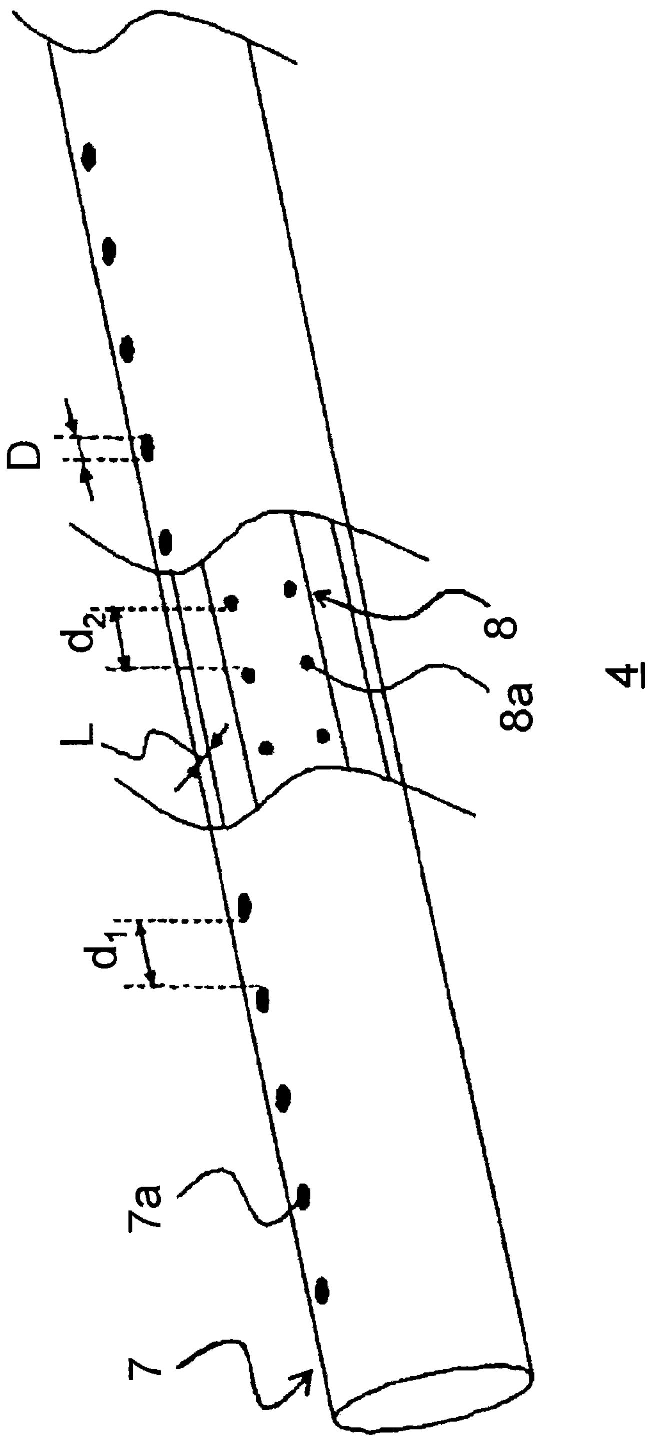
FIG. 2 is a schematic structural diagram illustrating an example of the gas jetting nozzle of the invention.

FIG. 1A and FIG. 1B illustrate a preferred embodiment of the carbonization furnace for manufacturing a carbon fiber bundle of the invention. More specifically, FIG. 1A is the front sectional diagram illustrating the outline of the vicinity of the fiber bundle inlet of the heat treatment chamber and the inlet sealing chamber adjacent to the fiber bundle inlet, and FIG. 1B is the schematic plan diagram of the same part as in FIG. 1A. In addition, FIG. 2 is a schematic structural diagram of an example of the gas jetting nozzle used in the invention.

A carbonization furnace for manufacturing a carbon fiber bundle (carbonization furnace) 1 has a heat treatment chamber 2 which is configured to heat the fiber bundle and filled with the inert gas, and an inlet sealing chamber 3 and an outlet sealing chamber (not unillustrated) which are configured to seal the gas in this heat treatment chamber.

In addition, in the inlet sealing chamber, the heat treatment chamber, and the outlet sealing chamber, a conveying path 5 for conveying a fiber bundle S is provided in the horizontal direction. Meanwhile, the conveying path is a space through which the fiber bundle can run, and the conveying path which penetrates the inlet sealing chamber, the heat treatment chamber, and the outlet sealing chamber in the horizontal direction is installed to the carbonization furnace for manufacturing a carbon fiber bundle of the invention. This makes it possible for the fiber bundle to run in a horizontal direction. Here, the horizontal direction refers to an arbitrary direction in the plane which is perpendicular to the vertical direction. Meanwhile, the horizontal direction, the vertical direction, and perpendicular (orthogonal) may be the substantially horizontal direction, the substantially vertical direction, and substantially perpendicular (substantially orthogonal).

The inert gas used in the carbonization furnace for manufacturing a carbon fiber bundle is not particularly limited, and it is possible to use nitrogen or argon, for example. Meanwhile, usually the inside of the heat treatment chamber (specifically, the conveying path part in the heat treatment chamber in FIG. 1A) is filled with this inert gas, but a reaction gas (for example, HCN, $CO_2$, and a lower hydrocarbon) generated by the heat treatment of the fiber bundle may be present in the heat treatment chamber when the fiber bundle S running on the conveying path 5 is heat treated. In other words, the gas in the heat treatment chamber sealed by each sealing chamber can be the inert gas and the reaction gas.

The heat treatment chamber 2 can have a fiber bundle inlet (inlet portion) 2*a* and an unillustrated fiber bundle outlet (outlet portion) for introducing and withdrawing the fiber bundle S and an exhaust port (not illustrated). In the carbonization furnace for manufacturing a carbon fiber bundle of the invention, it is possible to continuously introduce the fiber bundle to be heat treated through the inlet portion and to continuously withdraw the fiber bundle heat treated through the outlet portion.

Meanwhile, in the case of using the carbonization furnace for manufacturing a carbon fiber bundle of the invention as a carbonization furnace used for the carbonization process, the fiber bundle to be introduced through the inlet portion is a flameproofed fiber bundle (in the case of not performing the preliminary carbonization process) or a preliminarily carbonized fiber bundle (in the case of performing the preliminary carbonization process), and the fiber bundle to be withdrawn through the outlet portion is a carbon fiber bundle. In other words, the carbonization furnace for manufacturing a carbon fiber bundle of the invention can be a furnace to convert a flameproofed fiber bundle or a preliminarily carbonized fiber bundle to a carbon fiber bundle by an inert gas at a high temperature in a heating furnace.

In addition, in the case of using the carbonization furnace for manufacturing a carbon fiber bundle of the invention as a preliminary carbonization furnace, the fiber bundle to be introduced through the inlet portion is a flameproofed fiber bundle and the fiber bundle to be withdrawn through the outlet portion is a preliminarily carbonized fiber bundle. Moreover, in the case of using the carbonization furnace for manufacturing a carbon fiber bundle of the invention as a graphitization furnace, the fiber bundle to be introduced through the inlet portion is a carbon fiber bundle and the fiber bundle to be withdrawn through the outlet portion is a graphitized fiber bundle.

Meanwhile, in the invention, the sealing chamber (sealing device) is arranged to be adjacent to each of the inlet portion and the outlet portion of the heat treatment chamber. Specifically, the inlet sealing chamber (corresponding to reference numeral 3 in FIG. 1A and FIG. 1B) is arranged to be adjacent to the inlet portion of the heat treatment chamber and the outlet sealing chamber is disposed to be adjacent to the outlet portion of the heat treatment chamber. At least either of these sealing chambers has a gas jetting nozzle (double nozzle) 4 for jetting out the inert gas. Meanwhile, the structures (shape, dimension or the like) of the inlet sealing chamber and the outlet sealing chamber may be the same as or different from each other.

In addition, in the invention, it is possible to introduce an inert gas jetted out through the gas jetting nozzle 4 into the heat treatment chamber as it is and to fill the inside of the heat treatment chamber with this inert gas as illustrated in FIG. 1B. The inert gas which is supplied from at least either of the inlet sealing chamber or the outlet sealing chamber and filled in the heat treatment chamber can be sent to a predetermined exhaust gas treatment facility through the exhaust port installed between the inlet sealing chamber and the outlet sealing chamber and then evacuated. For example, this exhaust port can have a shape which is able to make the inert atmosphere in the heat treatment chamber uniform in the vertical direction, and the drawing position of gas is not also particularly limited. As this exhaust port, for example, the exhaust port that is buried in the ceiling or bottom part of the heat treatment chamber in the vertical direction and has a slit shape is used.

The fiber bundle S is heat treated (for example, carbonization treatment) in the inert atmosphere by passing through the carbonization furnace 1, more specifically, the heat treatment chamber 2. It is possible to use the method and conditions known in the carbon fiber field as the method and conditions of the heat treatment of the fiber bundle. For example, as illustrated in FIG. 1A, a heater 6 is arranged at each of the ceiling part and the bottom part of the heat treatment chamber 2 so as to maintain the temperature in the heat treatment chamber (specifically, the inert gas filled in the heat treatment chamber) at, for example, 800° C. or higher, whereby the heat treatment of the fiber bundle can be performed.

The cross-sectional shape of the furnace when the carbonization furnace for manufacturing a carbon fiber bundle of the invention (specifically, each of the sealing chambers and the heat treatment chamber) is cut to be perpendicular to the fiber axis of the running fiber bundle can be appropriately set depending on the arrayed number of the running fiber bundle, and for example, it can be a square or a rectangle. In addition, the cross-sectional shape of the opening part of the furnace (for example, the fiber bundle inlet or the fiber bundle outlet of the heat treatment chamber) can also be appropriately set in the same manner.

Meanwhile, in the invention, the fiber bundle S can run in a state in which a great number of fiber bundles are aligned in a sheet shape parallel with one another, more specifically, a state in which a great number of fiber bundles are arrayed on the same plane at equal intervals as illustrated in FIG. 1B when manufacturing the carbon fiber bundle. Hence, in the invention, it is possible to provide a heat treatment chamber 2 having opening portions (inlet portion and outlet portion) with a length corresponding to the width of the sheet in the sheet width direction (width direction of the sheet constituted by the fiber bundles: the vertical direction to the paper surface in FIG. 1B) in the center of the carbonization furnace for manufacturing a carbon fiber bundle. Meanwhile, the number of fiber bundles constituting the sheet can be appropriately selected, and for example, it can be from 10 to 2000 bundles.

The gas jetting nozzle 4 provided to at least either of the sealing chambers has a double tube structure (double nozzle structure) consisting of a hollow tubular outer tube (outer nozzle) 7 and a hollow tubular inner tube (inner nozzle) 8 as illustrated in FIG. 2. Meanwhile, the outer tube 7 is arranged on the surface side of the gas jetting nozzle more than the inner tube 8 in the gas jetting nozzle 4. In addition, the shape of these tubes may be any hollow tubular shape in the range in which the effect of the invention is obtained. It is possible to easily suppress the unevenness in temperature (for example, unevenness in temperature in the sheet width direction) caused by a decrease in temperature due to heat loss even when supplying the heated inert gas as the gas jetting nozzle has a double tube structure, and the fiber bundle can be uniformly treated as a result. Meanwhile, the effect of suppressing the unevenness in temperature is obtained but the pressure loss increases, and furthermore, the structure is complicated when gas jetting nozzle has a triple or more tube structure, and thus a double tube structure is adopted in the invention.

The central axis of the outer tube is preferably to match with the central axis of the inner tube from the viewpoint of suppressing the unevenness in jetting or temperature of the inert gas to be jetted out. In addition, the gas jetting nozzle 4 is disposed in a direction orthogonal and horizontal to the conveying direction of the fiber bundle (crosswise direction to the paper surface in FIG. 1A and FIG. 1B) in the sealing chamber, and for example, the gas jetting nozzle 4 can be extended to the length which is equal to or longer than the width W of the conveying path.

In the gas jetting nozzle, a plurality of gas jetting holes 7*a* are disposed on the outer tube 7 in the longitudinal direction of this outer tube over the length corresponding to the width of the conveying path. In addition, the unevenness in supply of the inert gas occurs in a case in which the interval between the gas jetting holes is significantly ununiform and thus it is preferable that the gas jetting holes 7*a* be disposed over the length corresponding to the width of the conveying path at equal intervals. In addition, fluffing occurs in some cases when the inert gas jetted out through the gas jetting nozzle comes in direct contact with the fiber bundle, and thus it is preferable to avoid the direct contact of the inert gas with the fiber bundle. For example, it is possible to dispose the gas jetting holes in the direction in which the inert gas is not jetted out toward the fiber bundle.

Meanwhile, there are places where the inert gas is not supplied in the width direction of the conveying path in the conveying path when the inert gas is jetted out through the gas jetting nozzle in a case in which the array of the gas jetting holes of the outer tube is shorter than the width W of the conveying path, that is, a case in which the gas jetting holes are not provided over the length corresponding to the width of the conveying path. Hence, the inert gas sequentially diffuses toward the places where the inert gas is not supplied even if the inert gas is uniformly supplied over the width direction of the conveying path in the vicinity of the gas jetting holes of the outer tube. As a result, there is a possibility that the unevenness in temperature or flow rate occurs in each of the sealing chamber and the heat treatment chamber in the course of the diffusion of inert gas. In other words, it is possible to supply the inert gas heated, for example, at from 200° C. to 500° C. uniformly over the direction orthogonal and horizontal to the running direction of the fiber bundle by arraying the gas jetting holes of the outer tube over the length corresponding to the width W of the conveying path described above. The gas jetting holes may be disposed on the gas jetting nozzle over the length corresponding to the width of the conveying path on both sides of the sheet width direction.

Meanwhile, the direction in which the inert gas is not jetted out toward the fiber bundle means the direction in which the inert gas jetted out does not come in direct contact with the running fiber bundle but the inert gas comes in contact with another member (for example, the wall surface of the sealing chamber) at least once and then supplied (contact) to the fiber bundle when the inert gas is jetted out through the gas jetting holes while holding the straightness. By virtue of this, the inert gas is not jetted out directly to the fiber bundle, and thus it is possible to supply the heated inert gas without disturbing the running of the fiber bundle. In addition, it is possible to prevent the carbides that are produced by the modification of flameproofed fiber yarn waste or tar-like substance caused by heat from adhering on the holes of the outer tube as the gas jetting holes of the outer tube do not face the direction of fiber bundle. As a result, a long term stable operation of the furnace can be realized.

In addition, the direction of the gas jetting holes of the outer tube is a direction in which the inert gas is not jetted out toward the fiber bundle, and it is preferably a direction facing the top plate or bottom plate of the sealing chamber. This makes it possible to easily suppress a decrease in quality due to the vibration and abrasion of the fiber bundle. Incidentally, the top plate and bottom plate of the sealing chamber can be disposed to be parallel to the fiber bundle (sheet surface constituted by the fiber bundles), respectively, and they can be disposed at the positions facing the fiber bundle by sandwiching the gas jetting nozzle. Meanwhile, the direction in which the inert gas is not jetted out toward the fiber bundle and which faces the top plate or bottom plate of the sealing chamber may be any direction as long as it is a direction in which the inert gas jetted out through the gas jetting holes of the outer tube comes in contact with this top plate or bottom plate at least once and then supplied to the fiber bundle. For example, the inert gas may be jetted out obliquely or perpendicularly with respect to the top plate surface or the bottom plate surface.

However, at this time, in the invention, it is particularly preferable to perpendicularly jet out the inert gas with respect to the top plate surface or the bottom plate surface in terms of sealing property. The inert gas jetted out is supplied to the fiber bundle after coming in contact with the top plate or the bottom plate and then with the gas jetting nozzle or the like in some cases, for example, in a case in which the inert gas is jetted out toward the direction of the gas jetting holes of the outer tube which is perpendicular to the top plate or bottom plate arranged to be parallel to the fiber bundle.

Incidentally, the shape of the top plate and the bottom plate can be appropriately selected. For example, the top plate and the bottom plate can have a recess as illustrated in FIG. 1A, and the gas jetting nozzle 4 can be disposed in this recess. It is possible to easily supply the inert gas without inhibiting the running of the fiber bundle by disposing the gas jetting nozzle in the recess. Moreover, it is also possible to jet out the inert gas through the gas jetting nozzle toward the bottom part in this recess (a top plate part 3*a* or a bottom plate part 3*b* arranged at a position facing the fiber bundle by sandwiching the gas jetting nozzle 4 to be parallel to the fiber bundle in FIG. 1A). Incidentally, the inert gas is jetted out perpendicularly with respect to the bottom part in this recess in FIG. 1A.

In the gas jetting nozzle, the hole area of the gas jetting holes 7*a* of the outer tube is 0.5 $mm^2$ or more and 20 $mm^2$ or less. The pressure loss is not too great when the hole area is 0.5 $mm^2$ or more, and thus the processing is facilitated. The hole area is preferably 1 $mm^2$ or more in terms of that and more preferably 3 $mm^2$ or more from the viewpoint of cleaning work of the hole. In addition, the rectifying effect is sufficiently obtained when the hole area is 20 $mm^2$ or less and thus diagonal flow is easily suppressed. The hole area is more preferably 15 $mm^2$ or less and even more preferably 10 $mm^2$ or less in terms of that. Here, the diagonal flow refers to the state in which the gas supplied is jetted out with respect to the conveying direction of the fiber bundle while being inclined in the width direction of the fiber bundle (vertical direction to the paper surface in FIG. 1B). Meanwhile, the average value of the hole area of each of the gas jetting holes 7*a* is adopted as the hole area of the gas jetting holes 7*a* of the outer tube in a case in which the hole areas of the gas jetting holes 7a of the outer tube are different for each of the gas jetting holes 7*a*.

In the gas jetting nozzle, the hole interval d1 of the gas jetting holes 7*a* in the longitudinal direction of the outer tube (vertical direction to the paper surface in FIG. 1B) is preferably 100 mm or less. The unevenness in supply of the inert gas hardly occurs when the hole interval d1 is 100 mm or less. The hole interval d1 is more preferably 50 mm or less and even more preferably 30 mm or less. Furthermore, the gas jetting holes 7*a* are preferably arrayed at equal intervals. Moreover, the hole interval d1 of the gas jetting holes 7*a* is preferably 5 mm or more and more preferably 10 mm or more from the viewpoint of suppressing an increase in manufacturing cost and the interference of the adjacent gas jetting holes.

Meanwhile, in FIG. 2, one row of the gas jetting holes arranged in the longitudinal direction of the outer tube are disposed in one row in the circumferential direction, but the number of row and the disposition of each row of the gas jetting holes 7*a* in the circumferential direction of the outer tube can be appropriately set within the range in which the requirement described above is satisfied and the effect of the invention is obtained.

In the gas jetting nozzle, the shape of the plurality of gas jetting holes 7*a* is not particularly limited, but it is preferably a round hole shape (for example, the shape of the opening surface of the gas jetting holes is oval or circular) from the viewpoint of ease of processing or the like. In addition, the hole area of the gas jetting holes 7*a* is preferably constant in the flow path direction of the gas jetting holes. Meanwhile, the shape and dimension of each of the gas jetting holes 7*a* arranged on the outer tube may be the same as or different from one another, but they are preferably the same as one another.

In the gas jetting nozzle, the ratio (L/D) of the flow path length (L) of the gas jetting holes of the outer tube to the longest hole length (D) of the gas jetting holes of the outer tube is preferably 0.2 or more. It is possible to suppress the occurrence of the diagonal flow in the longitudinal direction of the outer tube when the L/D is 0.2 or more, and the unevenness in the furnace width direction is easily suppressed as a result. For this reason, the L/D is more preferably 0.5 or more and even more preferably 1 or more. The effect of suppressing the diagonal flow increases but the pressure loss also tends to increase at the same time as the L/D is greater, and furthermore, the manufacturing cost also tends to increase as the thickness of the outer tube increases. Consequently, the L/D is preferably 5 or less, more preferably 4 or less, and even more preferably 3 or less from the viewpoint of compatibility between the sufficient rectifying effect and the effect of suppressing the pressure loss and manufacturing cost. Typically, the thickness of the outer tube is constant in the longitudinal direction of the outer tube. Meanwhile, the maximum diameter of the gas jetting holes 7*a* is the longest hole length (D) of the gas jetting holes 7*a* in a case in which the shape of the gas jetting holes 7*a* is a round hole shape as illustrated in FIG. 2.

In the gas jetting nozzle, a plurality of gas jetting holes 8*a* are arranged on the inner tube 8 in the longitudinal direction of the inner tube over the length corresponding to the width of the conveying path and the gas jetting direction of the gas jetting holes 8*a* is arranged in two or more directions of the circumferential direction of the inner tube. In addition, it is preferable that the row in which the plurality of gas jetting holes 8*a* be arranged in the longitudinal direction of the inner tube over the length corresponding to the width of the conveying path on the inner tube 8 be arranged in two or more rows in the circumferential direction of the inner tube. Meanwhile, the shape and dimension of each of the gas jetting holes 8*a* which are arranged on the inner tube 8 may be the same as or different from one another, but they are preferably the same as one another.

One side of the outer tube is heated by the hot inert gas which is heated and jetted out from the inner tube in a case in which the array of the gas jetting holes 8*a* is one row in the circumferential direction, and thus thermal strain is caused. The gas jetting nozzle is installed to the sealing chamber by being inserted, and thus the gas jetting nozzle comes in contact with the furnace (for example, the wall surface of the furnace) and the furnace or the gas jetting nozzle is damaged or fluffing occurs by the contact of the gas jetting nozzle with the fiber bundle in a case in which the thermal strain is caused in the outer tube, and thus a stable production is obstructed. For this reason, in the invention, it is preferable to equally array two or more rows of the gas jetting holes of the inner tube in the circumferential direction. However, the array may not be necessarily equal if the thermal strain is not caused on the outer tube. Incidentally, the number of array in the circumferential direction of the gas jetting holes of the inner tube is more preferably 3 or more rows from the viewpoint of more uniformly heating the outer tube, and it is preferably 6 or less rows from the viewpoint of manufacturing cost.

In addition, the gas jetting holes 8*a* of the inner tube are preferably disposed at equal intervals in the longitudinal direction from the viewpoint of uniformly jetting out the inert gas in the outer tube. In addition, the gas jetting holes 8*a* of the inner tube are preferably arranged in the longitudinal direction of the inner tube at equal intervals over the length corresponding to the width of the conveying path from the viewpoint of suppressing the unevenness in supply of the inert gas.

In the gas jetting nozzle, the shape of the plurality of gas jetting holes 8*a* is not particularly limited but is preferably the same shape, and it is preferably a round hole shape (for example, the shape of the opening surface of the gas jetting holes is oval or circular) in terms of ease of processing or the like. In addition, the hole area of the gas jetting holes 8*a* is preferably constant in the flow path direction of the gas jetting holes of the inner tube.

In the gas jetting nozzle, it is preferable that the hole area of the gas jetting holes 8*a* of the inner tube be 50 $mm^2$ or less. It is possible to suppress the diagonal flow in the supply port of the inner tube and to suppress the unevenness in temperature caused by the diagonal flow in the gap between the outer tube and the inner tube when the hole area of the gas jetting holes 8*a* is 50 $mm^2$ or less. As a result, it is possible to suppress the unevenness in temperature of the inert gas to be jetted out through the gas jetting holes of the outer tube. The hole area of the gas jetting holes 8*a* is more preferably 40 $mm^2$ or less from the viewpoint of suppressing the diagonal flow. In addition, the hole area of the gas jetting holes 8*a* is preferably 3 $mm^2$ or more from the viewpoint of suppressing the operating cost due to an increase in pressure loss and is preferably 10 $mm^2$ or more from the viewpoint of suppressing the fabrication cost.

In the gas jetting nozzle, the hole interval d2 of the gas jetting holes 8*a* in the longitudinal direction of the inner tube is 300 mm or less. The unevenness in heating of the outer tube decreases and the temperature of the inert gas between the inner tube and the outer tube is likely to be uniform when the hole interval in the longitudinal direction of the inner tube is 300 mm or less. As a result, it is easy to manage the temperature of the inert gas to be jetted out into the furnace to be uniform. The hole interval d2 of the gas jetting holes 8*a* is preferably 50 mm or less and more preferably 30 mm or less from the viewpoint that the jetting amount per one hole becomes a great gas quantity. In addition, the hole interval d2 of the gas jetting holes 8*a* is preferably 5 mm or more from the viewpoint of fabrication processing and more preferably 10 mm or more from the viewpoint of fabrication cost.

Meanwhile, in the gas jetting nozzle, the shape and dimension of the gas jetting holes of the outer tube and the shape and dimension of the gas jetting holes of the inner tube may be the same as or different from each other.

In the gas jetting nozzle, it is preferable that the position of the gas jetting holes of the inner tube do not match with the position of the gas jetting holes of the outer tube. "Not to match" means that the gas jetting holes of the outer tube are not present in the jetting direction of the inert gas through the gas jetting holes of the inner tube. By virtue of this, it is possible to easily prevent the inert gas jetted out through each of the gas jetting holes of the inner tube from being jetted out from the outer tube without being mixed in the gap between the inner circumferential surface of the outer tube and the outer circumferential surface of the inner tube and to easily suppress the occurrence of unevenness in temperature of the inert gas. In addition, it is preferable that the plurality of gas jetting holes of the outer tube and the plurality of gas jetting holes of the inner tube be respectively disposed at the positions where the gas jetting direction of the gas jetting holes of the inner tube and the gas jetting direction of the gas jetting holes of the outer tube are not overlapped at all. For example, by shifting the position in the circumferential direction of the gas jetting holes 7*a* from the position in the circumferential direction of the gas jetting holes 8*a* as illustrated in FIG. 2, it is possible to respectively dispose both of the gas jetting holes at the positions where they are not overlapped at all.

Meanwhile, the above disposition may be adopted as the position of the gas jetting holes of the inner tube and the position of the gas jetting holes of the outer tube for the gas jetting nozzle included in either of the inlet sealing chamber or the outlet sealing chamber in a case in which both of the inlet sealing chamber and the outlet sealing chamber are equipped with a gas jetting nozzle, but it is preferable to adopt the above disposition for the gas jetting nozzles included in both sealing chambers from the viewpoint of suppressing the unevenness in the entire region in the carbonization furnace.

In addition, the sealing chamber preferably has a labyrinth structure in which the throttling piece is arranged in the conveying direction of the fiber bundle with a regular interval. It is possible to easily maintain the pressure in the sealing chamber at high pressure by adopting the labyrinth structure, as a result, the contamination by outside air can be prevented as much as possible. Incidentally, the labyrinth structure may be adopted for either of the inlet sealing chamber or the outlet sealing chamber, but it is preferable to adopt the labyrinth structure for both of the sealing chambers from the viewpoint of preventing the contamination by outside air.

Meanwhile, examples of the structure of the throttling piece may include a rectangle, a trapezoid, and a triangle, and the throttling piece may be any shape as long as the pressure of the heat treatment chamber can be maintained at high pressure. However, the shape of the throttling piece is preferably rectangular from the viewpoint of sealing property. The disposing interval of the throttling piece in the conveying direction of the fiber bundle is usually adjusted according to the thickness of the fiber bundle to be introduced (for example, flameproofed fiber bundle) or the fiber bundle to be withdrawn (for example, carbon fiber bundle) and the magnitude of shaking, but it can be 10 mm or more and 150 mm or less, for example. In addition, the number of stages of the throttling piece (expansion chamber) in each sealing chamber is preferably 5 stages or more and 20 stages or less.

Moreover, at least either of the inlet sealing chamber or the outlet sealing chamber preferably has one or more pairs of gas jetting nozzles 4 disposed at the positions facing the vertical direction (vertical direction to the paper surface in FIG. 1A) by sandwiching the fiber bundle S as illustrated in FIG. 1A. It is possible to effectively suppress the flow of wind (inert gas) in the perpendicular direction (direction orthogonal to the sheet surface constituted by the fiber bundles), to further decrease the influence on the running fiber bundle, and for the fiber bundle to more stably run by installing one or more pairs of the gas jetting nozzles at the positions facing each other in the vertical direction by sandwiching the fiber bundle.

The number of pairs of the gas jetting nozzles disposed at the position facing each other in the vertical direction by sandwiching the fiber bundle is preferably one or more pairs from the viewpoint of sealing property. In addition, the number of pairs of the gas jetting nozzles is preferably four pairs or less in terms that the apparatus is complicated and more preferably three pairs or less from the viewpoint of an increase in manufacturing cost. Each pair of these gas jetting nozzles can be disposed in the running direction of the fiber bundle, for example, at equal intervals.

Meanwhile, the gas jetting nozzle in either of the inlet sealing chamber or the outlet sealing chamber may be disposed as the above, but it is preferable that the gas jetting nozzle in both of the sealing chambers be disposed as the above from the viewpoint of more stable running of the fiber bundle in a case in which both of the inlet sealing chamber and the outlet sealing chamber have the gas jetting nozzles.

In addition, the carbonization furnace for manufacturing a carbon fiber bundle of the invention can be equipped with a means (mechanism) to supply the inert gas heated, for example, at from 200 to 500° C. to the gas jetting nozzle (specifically, the inner tube) described above. The carbonization furnace for manufacturing a carbon fiber bundle of the invention is particularly suitable to jet out a hot gas at from 200 to 500° C. As the jetting means of the inert gas, it is possible to use a pressure pump and a fan, for example. Moreover, the carbonization furnace for manufacturing a carbon fiber bundle of the invention can be equipped with a means (mechanism) to adjust the jetting amount of the inert gas jetted out through the gas jetting nozzle. As this means, it is possible to use a valve-type or an orifice type, for example.

<Method for Manufacturing Carbon Fiber Bundle>

The method for manufacturing a carbon fiber bundle of the invention has a process of heat treating a fiber bundle by the carbonization furnace for manufacturing a carbon fiber bundle of the invention described above. Incidentally, this process can be, for example, a process selected from the preliminary carbonization process, the carbonization process, and the graphitization process which are described above. Moreover, in the invention, the inert gas which has been heated in advance is supplied to the inner tube of the gas jetting nozzle and the inert gas is jetted out through the gas jetting nozzle in these heat treatment processes. By the gas jetting nozzle used in the invention, it is possible to reduce the unevenness in the wind velocity of the inert gas to be jetted out even in the case of supplying the inert gas which has not been heated to the inner tube and jetting but to more effectively reduce the unevenness in temperature caused in the case of supplying the inert gas which has been heated in advance and jetting.

The heating temperature of the inert gas to be supplied to the inner tube is from 200 to 500° C. Not only the inflow of oxygen from the outside of the heat treatment chamber by the inert gas or the outflow of the reaction gas from the inside of the heat treatment chamber can be prevented but also the running fiber bundle can be sufficiently preheated even in a case in which the treating speed of the fiber bundle is fast and thus it is possible to prevent that the fiber bundle passes through the sealing chamber and enters the heat treatment chamber while having a low temperature when the heating temperature is 200° C. or higher. Hence, it is possible to prevent that the reaction gas in the heat treatment chamber is cooled by the fiber bundle having a low temperature to be tar and thus the fiber bundle is contaminated. On the other hand, it is possible to prevent the fiber bundle from being heat treated before the fiber bundle enters the heat treatment chamber and to prevent the production of the reaction gas in the inlet sealing chamber when the heating temperature of the inert gas is 500° C. or lower. In addition, the heating temperature of the inert gas to be supplied to the inner tube is preferably 250° C. or higher from the viewpoint of preheating the fiber bundle in advance and thus suppressing the contamination of the fiber bundle by the tar-like substance, and it is preferably 400° C. or lower from the viewpoint of suppressing the reaction of the fiber bundle.

According to the manufacturing method of the invention, it is possible to manage the unevenness in temperature in the width direction of the sealing chamber equipped with a gas jetting nozzle to be 8% or less. The firing of the precursor fiber bundle can be uniformly performed and the carbon fiber bundle with favorable quality is easily obtained when the unevenness in temperature can be managed to be 8% or less. It is more preferable as the unevenness in temperature is less, and the unevenness in temperature is preferably 5% or less and more preferably 3% or less.

In addition, according to the manufacturing method of the invention, it is possible to manage the unevenness in pressure in the width direction of the sealing chamber equipped with a gas jetting nozzle to be 5% or less. The firing of the precursor fiber bundle can be uniformly performed and the carbon fiber bundle with favorable quality is easily obtained when the unevenness in pressure is 5% or less. It is more preferable as the unevenness in pressure is less, and the unevenness in pressure is preferably 3% or less and more preferably 2% or less.

In addition, at that time, it is preferable that the inert gas be jetted out through the gas jetting nozzle at a flow rate of 1.0 $Nm^3$/hr or more and 100 $Nm^3$/hr or less per 1 m in the longitudinal direction (the same direction as the longitudinal direction of the outer tube) of the gas jetting nozzle. It is possible to easily maintain the internal pressure of the carbonization furnace for manufacturing a carbon fiber bundle and to easily maintain the inside of the heat treatment chamber which is a running space of the fiber bundle in the carbonization furnace in the inert atmosphere when the flow rate is 1.0 $Nm^3$/hr or more. The flow rate is more preferably 10 $Nm^3$/hr or more and even more preferably 20 $Nm^3$/hr or more from the viewpoint of the above.

On the other hand, it is possible to easily prevent that the disturbance occurs in the running state of the fiber bundle or the fiber bundles rub against one another so as to damage one another when the flow rate is 100 $Nm^3$/hr or less per 1 m in the longitudinal direction of the gas jetting nozzle. Furthermore, it is possible to easily prevent the damage due to the contact of the fiber bundle with the furnace wall or an increase in cost by the use of a great amount of the inert gas. As a result, it is possible to easily suppress the manufacturing cost low and to easily achieve an improvement in process productivity. The flow rate is more preferably 70 $Nm^3$/hr or less and even more preferably 50 $Nm^3$/hr or less from the viewpoint of the above. Here, the $Nm^3$ means the volume ($m^3$) in the standard state (0° C., 1 atm ($1.0\times10^5$ Pa)).

In addition, the heating temperature or flow rate of the inert gas can also be set in the above range for either of the inlet sealing chamber or the outlet sealing chamber but is preferably set in the above range for both of the sealing chambers in a case in which both of the inlet sealing chamber and the outlet sealing chamber are equipped with a gas jetting nozzle.

EXAMPLES

Hereinafter, the invention will be described with reference to specific examples. Meanwhile, in each example (Examples and Comparative Examples), the fiber bundle in a sheet state arrayed at equal intervals on the same plane was allowed to run in the conveying path which penetrates inside the carbonization furnace in the horizontal direction. At that time, the running pitch of the fiber bundle constituting the sheet was 10 mm. In addition, the opening width (length of the opening portion of the carbonization furnace when the carbonization furnace is cut to be perpendicular to the fiber axis) of this carbonization furnace (each sealing chamber and heat treatment chamber) was 1200 mm.

Example 1

Into the carbonization furnace 1, more specifically the inlet sealing chamber 3 illustrated in FIG. 1A and FIG. 1B, 100 bundles of the flameproofed fiber bundle having a total linear mass density of 1000 tex (number of single fibers constituting each fiber bundle: 10000) were introduced. At this time, the sheet width constituted by the fiber bundles was 1000 mm. Meanwhile, the tex denotes the mass (g) per 1000 m of the unit length.

In this inlet sealing chamber 3, one pair of the gas jetting nozzles (double nozzle) 4 which have the same structure and consist of the hollow cylindrical outer tube 7 and the hollow cylindrical inner tube 8 were disposed at the positions facing each other in the vertical direction by sandwiching the flameproofed fiber bundle. In addition, each of the gas jetting nozzles 4 was disposed in the direction orthogonal and horizontal to the conveying direction of the flameproofed fiber bundle, that is, the vertical direction to the paper surface in FIG. 1B as illustrated in FIG. 1B.

On the outer tube 7, 60 of the gas jetting holes 7*a* which were arranged in the direction in which the inert gas was not jetted out toward the flameproofed fiber bundle and had the same shape and dimension were equally disposed in the longitudinal direction (width direction of the conveying path) of the outer tube over the length corresponding to the width of 1200 mm of the conveying path and in one row in the circumferential direction of the outer tube. Meanwhile, the shape of these gas jetting holes 7*a* was a round hole shape. The hole area of the gas jetting holes 7*a* of the outer tube was 1 $mm^2$.

In addition, on the inner tube 8, 96 in total of the gas jetting holes 8*a* were disposed in the longitudinal direction of the inner tube at equal intervals over the length corresponding to the width of 1200 mm of the conveying path and equally in four rows in the circumferential direction of the inner tube. In addition, the hole interval of the gas jetting holes 8*a* in the longitudinal direction of the inner tube was 50 mm.

Figure 3B:
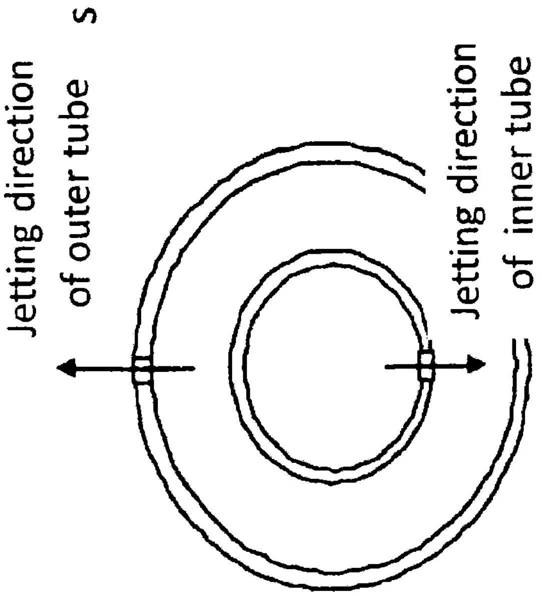
FIG. 3A is a cross-sectional diagram for describing the jetting direction of the inert gas by the gas jetting nozzle used in Example 1 (a) and FIG. 3B is a cross-sectional diagram therefor used in Comparative Example 3 (b).
Figure 3A:
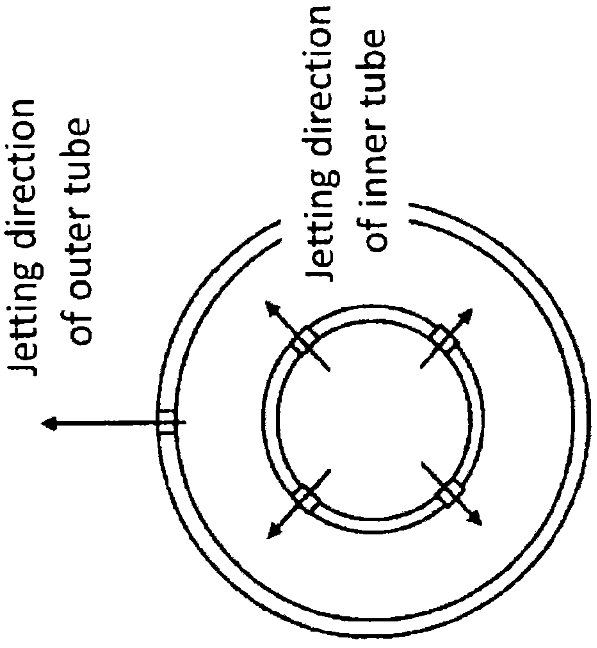

Meanwhile, as illustrated in FIG. 2 and FIG. 3A, the position in the circumferential direction of the gas jetting holes 8*a* of the inner tube did not match with the position in the circumferential direction of the gas jetting holes 7*a* of the outer tube in the gas jetting nozzles 4. In other words, the gas jetting holes 7*a* and the gas jetting holes 8*a* were respectively disposed at the positions where they did not match with each other at all. More specifically, the gas jetting holes 8*a* of the inner tube were disposed at equal intervals in the circumferential direction at the position shifted by 45° in the circumferential direction from the position in the circumferential direction of the gas jetting holes 7*a* of the outer tube. By virtue of this, the jetting direction of the inner tube and the jetting direction of the outer tube were managed not to match with each other.

Nitrogen which had been heated at 300° C. in advance was supplied to the inner tube of the gas jetting nozzle, and nitrogen was jetted out toward the top plate part 3*a* or the bottom plate part 3*b* illustrated in FIG. 1A, more specifically, in the backward direction perpendicular to the fiber bundle at 30 $Nm^3$/hr per 1 m in the longitudinal direction of the gas jetting nozzle. Incidentally, a compression pump was used as the means to supply this nitrogen heated at 300° C. to the inner tube of the gas jetting nozzle. In addition, a control valve was used as the means to adjust the jetting amount of this nitrogen gas. Furthermore, the backward direction perpendicular to the fiber bundle means the direction departing (receding)

from the fiber bundle of the direction perpendicular to the sheet surface constituted by the fiber bundles.

Subsequently, the flameproofed fiber bundle was introduced into the heat treatment chamber through the fiber bundle inlet 2*a*, and the heat treatment (carbonization treatment) thereof was performed for 1.5 minutes at 1000° C. Thereafter, this fiber bundle was withdrawn through the fiber bundle outlet of the heat treatment chamber and was allowed to run in the outlet sealing chamber (not illustrated) which was arranged to be adjacent to the fiber bundle outlet and had the same structure as the inlet sealing chamber 3, thereby obtaining the carbon fiber bundle. Meanwhile, nitrogen which was supplied through the gas jetting nozzles in each sealing chamber was introduced into the heat treatment chamber as it was, and thus the inside of the heat treatment chamber was maintained in a nitrogen atmosphere.

Next, the unevenness in temperature and the unevenness in pressure in the sealing chamber were calculated by the following procedure in order to verify the difference in the carbonization treatment in each Example. Moreover, the thermal strain of the gas jetting nozzle and the strength and grade of the carbon fiber thus obtained were evaluated. Meanwhile, the strength of the carbon fiber also varies depending on the state of the flameproofed fiber bundle or other conditions, and thus the results of these when the same flameproofed fiber bundle was used were relatively compared.

[Calculation of Unevenness in Temperature and Unevenness in Pressure in Width Direction of Sealing Chamber]

The temperature at the positions of 10 points at equal intervals on the entire width in the width direction (vertical direction to paper surface in FIG. 1B) of the inlet and outlet of the heat treatment chamber was measured by the sheathed thermocouple, and the unevenness in temperature was calculated. The pressure was measured by the pitot tube in the same manner, and the unevenness in pressure was calculated. In the invention, the value calculated by (highest temperature-lowest temperature)/average temperature of 10 points×100[%] among the temperatures of the measured 10 points was adopted as the unevenness in temperature. In addition, the value calculated by (maximum pressure-minimum pressure)/average pressure of 10 points×100[%] among the pressures of the measured 10 points was adopted as the unevenness in pressure. The maximum values for each unevenness in the inlet sealing chamber and the outlet sealing chamber were adopted as the unevenness in temperature and the unevenness in pressure in the width direction of the sealing chamber.

[Evaluation on Thermal Strain of Gas Jetting Nozzle]

The thermal strain of the gas jetting nozzle was evaluated by the following method. At an arbitrary point of the gas jetting nozzle, the point at which the change before and after the operation (use) was the maximum was measured using a Vernier caliper, and the average value of the measured values (maximum amount of change for each) of each of the gas jetting nozzles installed in the inlet sealing chamber and the outlet sealing chamber was adopted as the amount of strain. The thermal strain was evaluated based on the following criteria from the measurement results thus obtained.

A: the amount of strain is less than 2 mm.

B: the amount of strain is more than 2 mm and less than 20 mm.

C: the amount of strain is 20 mm or more.

[Strand Strength of Carbon Fiber Bundle (CF Strength)]

The strand strength of the carbon fiber bundle thus fabricated was measured in conformity with the epoxy resin-impregnated strand method specified in JIS-R-7601. Here, the measurement was performed 10 times, and the average value thereof was evaluated based on the following criteria.

A: the strand strength is 4903 N/cm$^2$ (500 kgf/cm$^2$) or more, and thus the strength of carbon fiber is high.

B: the strand strength is 4707 N/cm$^2$ (480 kgf/cm$^2$) or more and less than 4903 N/cm$^2$(500 kgf/cm$^2$), and thus the strength of carbon fiber is slightly low.

C: the strand strength is less than 4707 N/cm$^2$ (480 kgf/cm$^2$), and thus the strength of carbon fiber is low.

[Grade of Carbon Fiber]

The grade of the carbon fiber was evaluated by the following method. The carbon fiber bundle withdrawn from the outlet sealing chamber was observed for 60 minutes by illuminating with the LED light over the entire region in the sheet width direction, and the fluffing situation in this sheet width direction was evaluated based on the following criteria.

A: only several fluffs are seen in total in the sheet width direction, and thus the grade is favorable.

B: dozens of fluffs are partly seen in the sheet width direction.

C: dozens of fluffs are seen over the entire region in the sheet width direction.

In Example 1, both of the unevenness in pressure and the unevenness in temperature in the width direction of the sealing chamber were as small as 3%, the deformation of the gas jetting nozzle due to the thermal strain was less than 2 mm. In addition, the carbon fiber thus obtained was favorable in both strength and grade.

Example 2

The carbon fiber bundle was manufactured in the same manner as in Example 1 except that each sealing chamber was changed to the sealing chamber having a labyrinth structure. Specifically, five throttling pieces perpendicular to the sheet surface constituted by the fiber bundles were respectively provided to the sealing chamber upper portion and the sealing chamber lower portion sandwiching the fiber bundle in the conveying direction of the fiber bundle at equal intervals, thereby forming the five-stage expansion chamber in each sealing chamber. At that time, the disposing interval of the throttling pieces in the conveying direction of the fiber bundle was 150 mm. As a result, both of the unevenness in pressure and the unevenness in temperature in the width direction of the sealing chamber were as small as 2% or less, the deformation of the gas jetting nozzle due to the thermal strain was less than 2 mm. In addition, the carbon fiber thus obtained was favorable in both strength and grade.

Example 3

The carbon fiber bundle was manufactured in the same manner as in Example 1 except that the hole interval of the gas jetting holes of the inner tube in the longitudinal direction of the inner tube was changed to 150 mm. Meanwhile, at this time, the number of holes of the gas jetting holes of the inner tube was 32 in total, and the gas jetting holes were equally arrayed in four rows in the nozzle longitudinal direction. The unevenness in pressure in the width direction of the sealing chamber was 3%, but the unevenness in temperature was 8%. In addition, since the temperature history in the width direction of the carbon fiber bundle was different, the unevenness in strength and grade of the carbon fiber occurred to a little extent and fluffs were also partly seen in the width direction but to an extent without any problem.

Comparative Example 1

The carbon fiber bundle was manufactured in the same manner as in Example 1 except that a single tube gas jetting nozzle consisting of an outer tube used in Example 1 was used as the gas jetting nozzles which had the same structure and were provided to each sealing chamber. As a result, the unevenness in pressure in the width direction of the sealing chamber was as small as 3%, but a decrease in temperature due to heat loss was detected in the longitudinal direction of the gas jetting nozzle (nozzle longitudinal direction) and thus the unevenness in temperature in the width direction of the sealing chamber was as great as 20%. In addition, since the temperature history in the width direction of the carbon fiber bundle was different, the unevenness in strength and grade occurred and a great number of fluffs were also seen.

Comparative Example 2

The carbon fiber bundle was manufactured in the same manner as in Example 1 except that the hole area of the gas jetting holes of the outer tube was changed to 50 $mm^2$. As a result, the diagonal flow was detected in the nozzle longitudinal direction, the unevenness in pressure in the width direction of the sealing chamber was as great as 20%, and the unevenness in temperature was also as great as 10%. In addition, the strength of the carbon fiber thus obtained was slightly low, and dozens of fluffs were seen over the entire region in the width direction.

Comparative Example 3

The carbon fiber bundle was manufactured in the same manner as in Example 1 except that the number of row of the gas jetting holes in the circumferential direction of the inner tube was changed to one row as illustrated in FIG. 3B. Meanwhile, at this time, the number of holes of the gas jetting holes of the inner tube was 24, and the gas jetting holes were equally arrayed in one row in the nozzle longitudinal direction. As a result, hot wind (heated nitrogen) jetted out from the inner tube was blown to one side of the outer tube, and thus thermal strain was caused, the unevenness in pressure was as great as 10%, and the unevenness in temperature was also as great as 10%. The strength of the carbon fiber thus obtained was low, and dozens of fluffs were seen over the entire region in the width direction. After the operation, the gas jetting nozzle was drawn out and confirmed, and it was detected that the gas jetting nozzle was in contact with the wall surface of the sealing chamber by strain and thus a part thereof was damaged.

Comparative Example 4

The carbon fiber bundle was manufactured in the same manner as in Example 1 except that the hole interval of the gas jetting holes of the inner tube in the longitudinal direction of the inner tube was changed to 400 mm. Meanwhile, at this time, the number of holes of the gas jetting holes of the inner tube was 16, and the gas jetting holes were equally arrayed in four rows in the nozzle longitudinal direction. As a result, unevenness occurred in jetting of nitrogen from the inner tube, and thus the unevenness in pressure in the width direction of the sealing chamber was 3% but the unevenness in temperature was a little great as 10%. In addition, since the temperature history in the width direction of the carbon fiber bundle was different, the unevenness in strength and grade of the carbon fiber occurred and fluffs were also seen.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Structure of gas jetting nozzle | | Double | Double | Double | Single | Double | Double | Double |
| Labyrinth structure in sealing chamber | | Absence | Presence | Absence | Absence | Absence | Absence | Absence |
| Outer tube | Hole area ($mm^2$) | 1 | 1 | 1 | 1 | 50 | 1 | 1 |
| Inner tube | Number of row in circumferential direction | 4 | 4 | 4 | — | 4 | 1 | 4 |
| | Hole interval (mm) | 50 | 50 | 150 | — | 50 | 50 | 400 |
| Temperature of nitrogen when jetted out | | 300° C. | 300° C. | 300° C. | 300° C. | 300° C. | 300° C. | 300° C. |
| Flow rate of nitrogen when jetted out | | 30 $Nm^3/hr$ | 30 $Nm^3/hr$ | 30 $Nm^3/hr$ | 30 $Nm^3/hr$ | 30 $Nm^3/hr$ | 30 $Nm^3/hr$ | 30 $Nm^3/hr$ |
| Unevenness in pressure in width direction of sealing chamber | | 3% | Within 2% | 3% | 3% | 20% | 10% | 3% |
| Unevenness in temperature in width direction of sealing chamber | | 3% | Within 2% | 8% | 20% | 10% | 10% | 10% |
| Thermal strain of gas jetting nozzle | | A | A | B | — | A | C | B |
| Strand strength of carbon fiber bundle | | A | A | B | B | B | C | B |
| Grade of carbon fiber | | A | A | B | C | C | C | C |
| Operating situation | | No problem | No problem | No problem | No problem | No problem | Part of nozzle was damaged | No problem |

As described above, it has been found that it is possible to obtain an even atmosphere over the entire region in the carbonization furnace and to obtain a carbon fiber excellent in performance, appearance, and handling properties by using the carbonization furnace for manufacturing a carbon fiber bundle of the invention which has a sealing chamber exhibiting high sealing performance and favorable maintainability.

EXPLANATIONS OF LETTERS OR NUMERALS

1 carbonization furnace for manufacturing carbon fiber bundle (carbonization furnace)
2 heat treatment chamber
2*a* fiber bundle inlet of heat treatment chamber (inlet portion)
3 inlet sealing chamber
3*a* top plate part that is disposed at the position facing the fiber bundle by sandwiching the gas jetting nozzle to be parallel to the fiber bundle
3*b* bottom plate part that is disposed at the position facing the fiber bundle by sandwiching the gas jetting nozzle to be parallel to the fiber bundle
4 gas jetting nozzle (double nozzle)
5 conveying path
6 heater
7 outer tube (outer nozzle)
7*a* gas jetting holes of outer tube
8 inner tube (inner nozzle)
8*a* gas jetting holes of inner tube
S fiber bundle
W width of conveying path
L flow path length of gas jetting holes of outer tube
D longest hole length of gas jetting holes of outer tube
d1 hole interval of gas jetting holes of outer tube
d2 hole interval of gas jetting holes of inner tube

The invention claimed is:

1. A carbonization furnace for manufacturing a carbon fiber bundle comprising:
- a heat treatment chamber for heating a fiber bundle which has a fiber bundle inlet and a fiber bundle outlet through which the fiber bundle is introduced and withdrawn and is filled with an inert gas;
- an inlet sealing chamber and an outlet sealing chamber for sealing the gas in the heat treatment chamber which are arranged to be adjacent to the fiber bundle inlet and the fiber bundle outlet of the heat treatment chamber, respectively;
- a gas jetting nozzle provided on at least one of the inlet sealing chamber and the outlet sealing chamber; and
- a conveying path for conveying the fiber bundle which is provided in the horizontal direction in the inlet sealing chamber, the heat treatment chamber, and the outlet sealing chamber, wherein
- the gas jetting nozzle has a double tube structure consisting of a hollow tubular inner tube and a hollow tubular outer tube and is disposed in a direction orthogonal and horizontal to a conveying direction of the fiber bundle, wherein
- a plurality of gas jetting holes are disposed on the outer tube in a longitudinal direction of the outer tube over the length corresponding to a width of the conveying path, and a hole area of the gas jetting holes of the outer tube is 0.5 $mm^2$ or more and 20 $mm^2$ or less, and
- a plurality of gas jetting holes are arranged on the inner tube in a longitudinal direction of the inner tube over the length corresponding to a width of the conveying path and a gas jetting direction of the gas jetting holes is arranged in two or more directions of a circumferential direction of the inner tube, and a hole interval between the gas jetting holes of the inner tube in the longitudinal direction of the inner tube is 300 mm or less.

2. The carbonization furnace for manufacturing a carbon fiber bundle according to claim 1, wherein a ratio (L/D) of a flow path length (L) of a plurality of gas jetting holes of the outer tube to a longest hole length (D) of the gas jetting holes is 0.2 or more.

3. The carbonization furnace for manufacturing a carbon fiber bundle according to claim 1, wherein a hole interval of a plurality of gas jetting holes in a longitudinal direction of the outer tube is 100 mm or less.

4. The carbonization furnace for manufacturing a carbon fiber bundle according to claim 1, wherein a plurality of gas jetting holes of the outer tube are arranged in a longitudinal direction of the outer tube over the length corresponding to a width of the conveying path at equal intervals.

5. The carbonization furnace for manufacturing a carbon fiber bundle according to claim 1, wherein each hole area of a plurality of gas jetting holes of the inner tube is 50 $mm^2$ or less.

6. The carbonization furnace for manufacturing a carbon fiber bundle according to claim 1, wherein a plurality of gas jetting holes of the inner tube are arranged in a longitudinal direction of the inner tube over the length corresponding to a width of the conveying path at equal intervals.

7. The carbonization furnace for manufacturing a carbon fiber bundle according to claim 1, wherein a plurality of gas jetting holes of the outer tube are arranged in a direction in which an inert gas is not jetted out toward the fiber bundle.

8. The carbonization furnace for manufacturing a carbon fiber bundle according to claim 1, wherein a plurality of gas jetting holes having the same shape and dimension are arranged on the outer tube and a plurality of gas jetting holes having the same shape and dimension are arranged on the inner tube.

9. The carbonization furnace for manufacturing a carbon fiber bundle according to claim 1, wherein a plurality of gas jetting holes of the outer tube and a plurality of gas jetting holes of the inner tube are respectively disposed at positions where a gas jetting direction of the gas jetting holes of the inner tube and a gas jetting direction of the gas jetting holes of the outer tube are not overlapped at all.

10. The carbonization furnace for manufacturing a carbon fiber bundle according to claim 1, wherein either or both of the inlet sealing chamber and the outlet sealing chamber have a labyrinth structure having a throttling piece arranged in a conveying direction of the fiber bundle with a regular interval.

11. The carbonization furnace for manufacturing a carbon fiber bundle according to claim 1, wherein either or both of the inlet sealing chamber and the outlet sealing chamber have one or more pairs of the gas jetting nozzles disposed at positions facing each other in a vertical direction by sandwiching the fiber bundle.

12. A method for manufacturing a carbon fiber bundle comprising a process of heat treating the fiber bundle by the carbonization furnace for manufacturing a carbon fiber bundle according to claim 1, wherein
- in the process, an inert gas at from 200 to 500° C. is supplied to an inner tube of the gas jetting nozzle and the inert gas is jetted out through a plurality of gas jetting holes of an outer tube so that a temperature difference in a width direction of either or both of the inlet sealing chamber and the outlet sealing chamber which are equipped with the gas jetting nozzle is 8% or less.

13. The method for manufacturing a carbon fiber bundle according to claim 12, wherein an inert gas is jetted out through the gas jetting nozzle at a flow rate per 1 m in a longitudinal direction of the gas jetting nozzle of 1.0 $Nm^3$/hr or more and 100 $Nm^3$/hr or less to heat treat the fiber bundle.

* * * * *